(12) United States Patent
Masumura et al.

(10) Patent No.: US 12,352,558 B2
(45) Date of Patent: Jul. 8, 2025

(54) SHAPE RECONSTRUCTION METHOD AND IMAGE MEASUREMENT DEVICE

(71) Applicants: Machine Vision Lighting Inc., Tokyo (JP); MITUTOYO CORPORATION, Kanagawa (JP)

(72) Inventors: Shigeki Masumura, Tokyo (JP); Yasuhiro Takahama, Kanagawa (JP); Jyota Miyakura, Chiba (JP); Masaoki Yamagata, Kanagawa (JP)

(73) Assignees: MACHINE VISION LIGHTING INC., Tokyo (JP); MITUTOYO CORPORATION, Kanagawa (JP)

( * ) Notice: Subject to any disclaimer, the term of this patent is extended or adjusted under 35 U.S.C. 154(b) by 188 days.

(21) Appl. No.: 17/780,735

(22) PCT Filed: Nov. 26, 2020

(86) PCT No.: PCT/JP2020/044058
§ 371 (c)(1),
(2) Date: May 27, 2022

(87) PCT Pub. No.: WO2021/107027
PCT Pub. Date: Jun. 3, 2021

(65) Prior Publication Data
US 2022/0412727 A1    Dec. 29, 2022

(30) Foreign Application Priority Data
Nov. 29, 2019  (JP) .................................. 2019-217429

(51) Int. Cl.
*G01B 11/24* (2006.01)
*G01N 21/88* (2006.01)
*G01N 21/95* (2006.01)

(52) U.S. Cl.
CPC .......... *G01B 11/24* (2013.01); *G01N 21/8806* (2013.01); *G01N 21/8851* (2013.01); *G01N 21/9515* (2013.01); *G01N 2021/8887* (2013.01)

(58) Field of Classification Search
CPC ................ G01B 11/24; G01B 11/2509; G01N 21/8806; G01N 21/8851; G01N 21/9515;
(Continued)

(56) References Cited

U.S. PATENT DOCUMENTS

| 8,363,929 B2 | 1/2013 | Kojima et al. |
| 8,441,532 B2 | 5/2013 | Potapenko |

(Continued)

FOREIGN PATENT DOCUMENTS

| CN | 101813460 | 8/2010 |
| CN | 107615049 | 1/2018 |

(Continued)

OTHER PUBLICATIONS

English translation of WO2019/111426 (Year: 2019).*
(Continued)

*Primary Examiner* — Christina A Riddle
(74) *Attorney, Agent, or Firm* — Greenblum & Bernstein, P.L.C.

(57) ABSTRACT

An illumination device has a light source unit, a lens unit, and a filter unit An imaging device receives object light, generated by the illumination light, from the measurement object at a predetermined observation solid angle, and pixels of the imaging device can each identify the different light wavelength ranges. A processing device includes an arithmetic unit configured to obtain a normal vector at each point of the measurement object corresponding to each pixel from inclusion relation between the plurality of solid angle regions, constituting the object light, and the predetermined
(Continued)

observation solid angle, and a shape reconstruction unit configured to reconstruct the shape of the measurement object.

15 Claims, 8 Drawing Sheets

(58) Field of Classification Search
CPC ... G01N 2021/8887; G01N 2021/8845; G01N 2021/8864; G01N 2201/104; G01N 2021/8848; G01N 2021/8854; G01N 2021/95676; G01N 21/21; G01N 21/255; G01N 21/47; G01N 21/84; G01N 21/88; G01N 21/956; G01N 21/93; G06T 2207/10024; G06T 7/55; G06T 7/0004; G06T 5/90; G06T 7/30; G06T 17/30; G06T 7/586; G06T 15/00; G06T 7/0002; G06T 7/0006; G06T 7/0008; G06T 7/001; G06T 7/564; G06T 7/521; G02B 21/0016; G02B 21/082; G02B 27/288; G02B 5/201; G02B 5/205; G02B 5/30; H01L 22/12; H01L 22/30
USPC .......... 356/237.1–237.6, 402–408, 416–425, 356/625–640, 600–613; 348/135; 382/103, 203, 154
See application file for complete search history.

(56) References Cited

U.S. PATENT DOCUMENTS

| | | | |
|---|---|---|---|
| 10,598,603 | B2 | 3/2020 | Masumura |
| 10,883,944 | B2 | 1/2021 | Masumura |
| 2010/0214406 | A1 | 8/2010 | Potapenko |
| 2010/0289878 | A1* | 11/2010 | Sato ............... H04N 13/239 348/46 |
| 2011/0262007 | A1 | 10/2011 | Kojima et al. |
| 2012/0300033 | A1* | 11/2012 | Singh ............... A61B 1/045 348/45 |
| 2013/0070087 | A1 | 3/2013 | Potapenko |
| 2014/0071243 | A1* | 3/2014 | Nakatsukasa ......... G01B 11/24 348/46 |
| 2018/0299386 | A1* | 10/2018 | Masumura ....... G01N 21/95623 |
| 2020/0158657 | A1 | 5/2020 | Masumura |

FOREIGN PATENT DOCUMENTS

| | | | |
|---|---|---|---|
| JP | H07-306023 A | | 11/1995 |
| JP | 2011-145171 | | 7/2011 |
| JP | 2011-232087 A | | 11/2011 |
| JP | 2018-40644 | | 3/2018 |
| JP | 6451821 B1 | | 1/2019 |
| JP | 2019-100930 | | 6/2019 |
| WO | WO-2019111426 A1 * | 6/2019 | ............ G01B 11/24 |

OTHER PUBLICATIONS

Office Action issued in Corresponding CN Patent Application No. 202080082861.2, dated Jul. 5, 2023, along with an English translation thereof.
Extended European Search Report Issued in Corresponding EP Patent Application No. 20893506.4, dated Nov. 28, 2023.
International Preliminary Report on Patentability issued in International Patent Application No. PCT/JP2020/044058, dated Jun. 9, 2022, along with an English translation thereof.
International Search Report issued in International Bureau of WIPO Patent Application No. PCT/JP2020/044058, dated Jan. 19, 2021, along with an English translation thereof.
Office Action issued in Corresponding KR Patent Application No. 10-2022-7020636, dated Mar. 21, 2025, along with an English translation thereof.

* cited by examiner

FIG.3A      FIG.3B      FIG.3C      FIG.3D
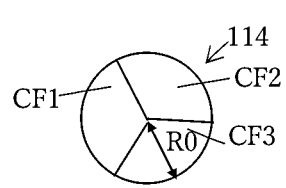 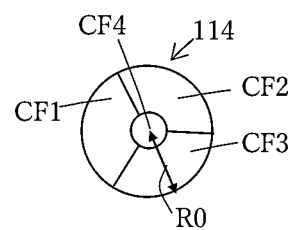 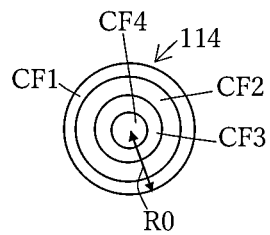 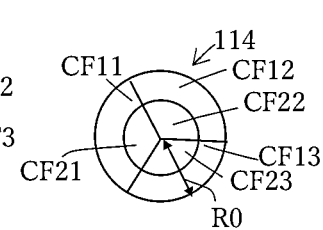
FIG.3E      FIG.3F      FIG.3G      FIG.3H
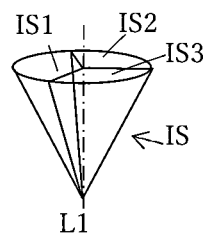 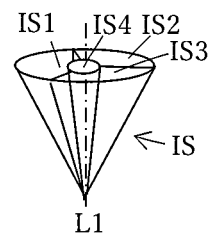 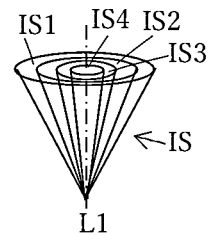 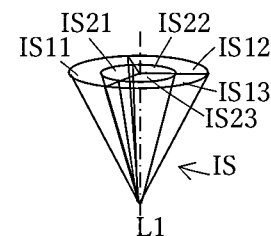
FIG.4A
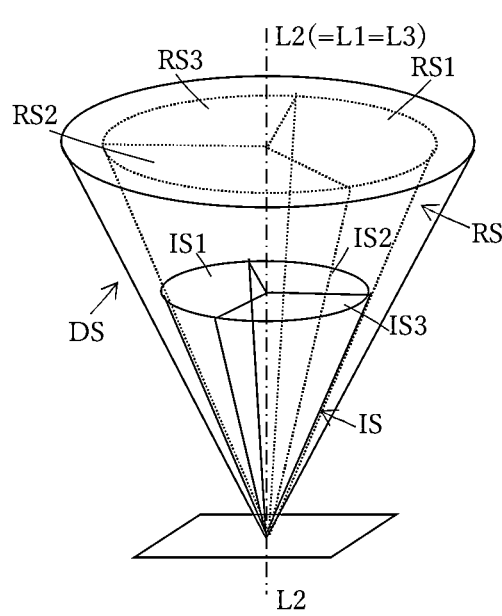
FIG.4B
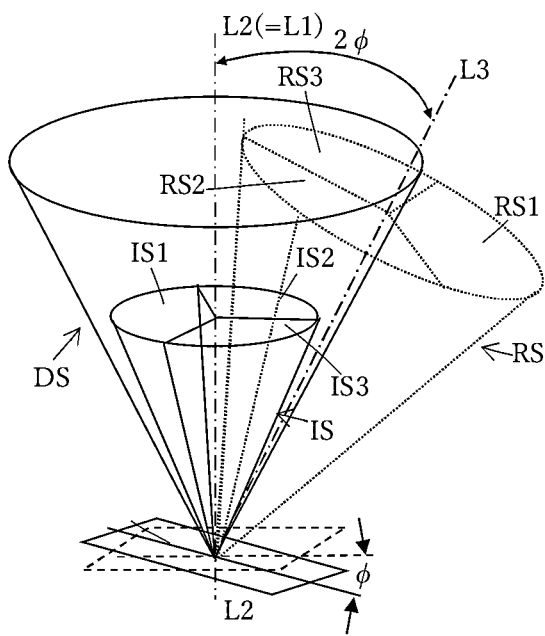

| Rt | Gt | Bt | Vtnx | Vtny |
|---|---|---|---|---|
| 100 | 100 | 50 | 0.2 | 0.1 |
| 90 | 100 | 50 | 0.25 | 0.1 |
| 80 | 100 | 50 | 0.3 | 0.1 |
| 70 | 100 | 50 | 0.35 | 0.1 |
| 60 | 100 | 50 | 0.4 | 0.1 |

SHAPE RECONSTRUCTION METHOD AND IMAGE MEASUREMENT DEVICE

TECHNICAL FIELD

The present invention relates to a shape reconstruction method and an image measurement device, and particularly relates to a shape reconstruction method and an image measurement device capable of quickly reconstructing information for each point of a measurement object in a captured image of the measurement object.

BACKGROUND ART

An image measurement device that reconstructs shape information of a measurement object, by applying illumination light to the measurement object and processing an image captured, is conventionally known. For example, an image measurement device that captures an image of a measurement object by a telecentric imaging optical system and measures the shape of the measurement object falls under this category. The telecentric imaging optical system is suitable mainly for measuring the two-dimensional shape of a surface of the measurement object because it has the characteristic of causing less blurring of the image even when there is a level difference in an optical axis direction due to deep depth of field. However, with the telecentric imaging optical system, it is difficult to detect information in a height direction of the measurement object, and thus, the telecentric imaging optical system is not appropriate for measuring the three-dimensional shape of the measurement object.

In recent years, as described in Patent Literature 1, an inspection system capable of obtaining inclination information for each point of a measurement object on the basis of a single captured image, by using a specific illumination device for testing, has been developed. This invention makes it possible to extract information on defects such as minute irregularities and foreign matter in the measurement object.

CITATION LIST

Patent Literature

[Patent Literature 1] Japanese Patent No. 6451821

SUMMARY OF INVENTION

Technical Problem

However, although Patent Literature 1 describes that the inspection system can obtain the inclination information for each point of the measurement object with single imaging, it does not clarify specific steps and configurations for reconstructing information for each point of the measurement object that takes advantage of this ease and speed.

The present invention has been made to solve the above-described conventional problems, and aims at providing a shape reconstruction method and an image measurement device that are capable of quickly reconstructing information for each point of a measurement object in a captured image of the measurement object.

Solution to Problem

To solve the above-described problems, the invention according to a first aspect of the present application is a shape reconstruction method for reconstructing a shape of a measurement object by applying illumination light to the measurement object and processing an image that has been captured, the shape reconstruction method including: applying, to the measurement object, the illumination light having a specific irradiation solid angle including a plurality of solid angle regions with optical attributes, each different from each other; receiving object light, generated by the illumination light, from the measurement object at a predetermined observation solid angle and capturing the image; obtaining a normal vector at each point of the measurement object corresponding to each pixel from inclusion relation between the plurality of solid angle regions, constituting the object light, and the predetermined observation solid angle, on the basis of the optical attributes identified at each pixel of the image; and obtaining, from the normal vector, inclination information for each point of the measurement object and reconstructing the shape of the measurement object.

In the invention according to another aspect of the present application, the irradiation solid angle is allowed to be uniform at each point of the measurement object.

In the invention according to another aspect of the present application, the plurality of solid angle regions are provided around an irradiation optical axis of the irradiation solid angle of the illumination light.

In the invention according to another aspect of the present application, the optical attributes are light wavelength ranges.

The invention according to another aspect of the present application further including, before applying the illumination light to the measurement object, applying the illumination light to the measurement object itself or a specific jig, receiving the object light from the measurement object itself or the specific jig and capturing the image, and obtaining correspondence relations between the optical attributes and the normal vector is performed.

In the invention according to another aspect of the present application, the specific jig is a reference sphere or a reference plane.

In the invention according to another aspect of the present application, the correspondence relations are configured as a correspondence table.

In the invention according to another aspect of the present application, the correspondence relations are configured as a complementary function.

In the invention according to another aspect of the present application, the normal vector is normalized.

In the invention according to another aspect of the present application, in a case in which the plurality of solid angle regions are not rotationally symmetrical with respect to an observation optical axis of the observation solid angle, of rotating the measurement object around the observation optical axis at a predetermined angle is performed after receiving object light from the measurement object and capturing the image, and obtaining the normal vector at each point of the measurement object is performed after applying the illumination light to the measurement object and receiving the object light from the measurement object and capturing the image are performed a predetermined number of times.

The invention according to another aspect of the present application is an image measurement device for measuring a shape of a measurement object, the image measurement device including: an illumination device configured to apply illumination light to the measurement object; an imaging device configured to capture an image of the measurement object and output the image; and a processing device configured to process the image, wherein the illumination device has a light source unit configured to emit the illumination light, a lens unit configured to apply the illumination light to the measurement object at a specific irradiation solid angle, and a filter unit, which is disposed between the light source unit and the lens unit, that is configured to separate the inside of the specific irradiation solid angle into a plurality of solid angle regions with optical attributes, each different from each other; the imaging device receives object light, generated by the illumination light, from the measurement object at a predetermined observation solid angle, and pixels of the imaging device can each identify the different optical attributes; and the processing device includes an arithmetic unit configured to obtain a normal vector at each point of the measurement object corresponding to each pixel from inclusion relation between the plurality of solid angle regions, constituting the object light, and the predetermined observation solid angle, and a shape reconstruction unit configured to reconstruct, from the normal vector, the shape of the measurement object by obtaining inclination information for each point of the measurement object.

In the invention according to another aspect of the present application, the filter unit is disposed on an irradiation optical axis of the illumination light in the vicinity of a position determined by a focal length of the lens unit.

In the invention according to another aspect of the present application, the filter unit includes filter regions, each different from each other, around the irradiation optical axis so that the plurality of solid angle regions are provided around the irradiation optical axis of the illumination light.

In the invention according to another aspect of the present application, the filter unit is configured to allow the light wavelength ranges, as the optical attributes, to be different from each other.

In the invention according to another aspect of the present application, the processing device includes a memory unit configured to store correspondence relations between the optical attributes and the normal vector, and the arithmetic unit is configured to obtain the normal vector on the basis of the correspondence relations.

In the invention according to another aspect of the present application, the processing device normalizes the normal vector.

The invention according to another aspect of the present application includes a rotary table configured to be capable of rotating the measurement object around an observation optical axis.

In the invention according to another aspect of the present application, the arithmetic unit includes a consistency determination unit configured to compare the normal vector at each point of the measurement object stored in advance with the normal vector at each point obtained from the measurement object newly imaged, and to extract portions, each different from each other.

Advantageous Effects of Invention

According to the present invention, it is possible to quickly reconstruct the information for each point of the measurement object in the captured image of the measurement object.

BRIEF DESCRIPTION OF DRAWINGS

FIG. 3A is a drawing illustrating a filter unit having three filter regions around an irradiation optical axis in the illumination device of FIG. 1;

FIG. 3B is a drawing illustrating a filter unit having one filter region at the center of the irradiation optical axis and three filter regions around the irradiation optical axis in the illumination device of FIG. 1;

FIG. 3C is a drawing illustrating a filter unit having concentric four filter regions in the illumination device of FIG. 1;

FIG. 3D is a drawing illustrating a filter unit including concentric two filter regions each of which has three filter regions arranged around the irradiation optical axis in the illumination device of FIG. 1;

FIG. 3E is a drawing illustrating an irradiation solid angle corresponding to the filter unit illustrated in FIG. 3A;

FIG. 3F is a drawing illustrating an irradiation solid angle corresponding to the filter unit illustrated in FIG. 3B;

FIG. 3G is a drawing illustrating an irradiation solid angle corresponding to the filter unit illustrated in FIG. 3C;

FIG. 3H is a drawing illustrating an irradiation solid angle corresponding to the filter unit illustrated in FIG. 3D;

FIG. 4A is a drawing illustrating the relation between an irradiation solid angle, a reflection solid angle, and an observation solid angle when a normal vector of a surface of a measurement object coincides with an observation optical axis;

FIG. 4B is a drawing illustrating the relation between the irradiation solid angle, the reflection solid angle, and the observation solid angle when the normal vector of the surface of the measurement object does not coincide with the observation optical axis;

DESCRIPTION OF EMBODIMENTS

A first embodiment of the present invention will be described below using FIGS. 1 to 10. Note that, the present invention is not limited by the contents described in the following embodiments. Also, the configuration requirements in the embodiments described below include those that can be easily assumed by those skilled in the art, those that are substantially the same, and those that are within the scope of so-called equivalence. Furthermore, the components disclosed in the embodiments described below may be combined or selected as appropriate.

Figure 1:
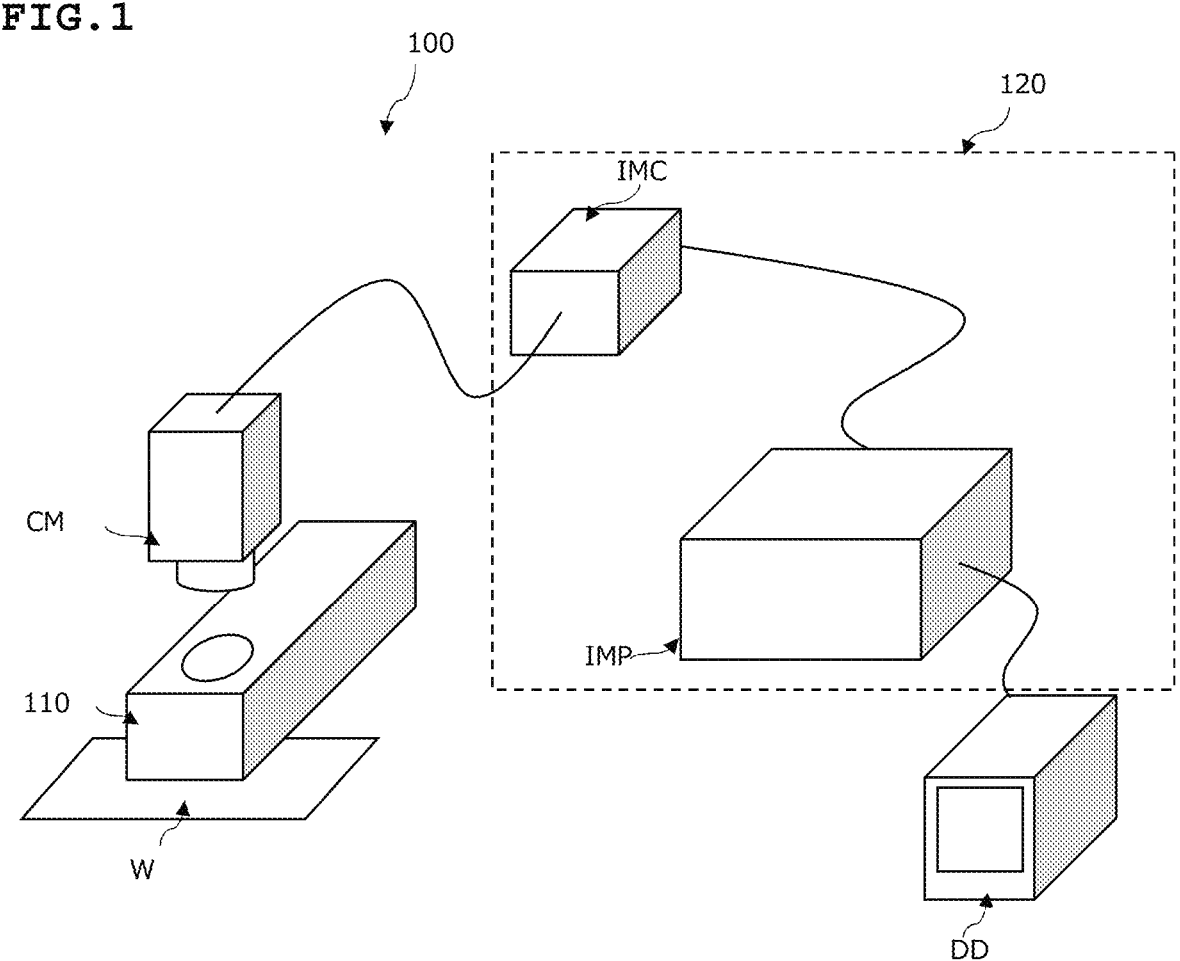
FIG. 1 is a schematic diagram illustrating an image measurement device according to a first embodiment of the present invention.

As illustrated in FIG. 1, an image measurement device 100 includes an illumination device 110 configured to apply illumination light to a measurement object W, an imaging device CM configured to capture an image of the measurement object by receiving reflected light from the measurement object W and to output the image, a processing device 120 configured to process the image, and a display device DD. The processing device 120 includes an image capture IMC and an image processing device IMP. With this configuration, the image measurement device 100 is capable of applying the illumination light to the measurement object W, measuring the shape of the measurement object by processing the captured image, and reconstructing the shape. Note that, in the present embodiment, it is preferable that the surface of the measurement object W is close to a glossy surface, even when having a complex shape.

Each component will be described below in detail.

Figure 2:
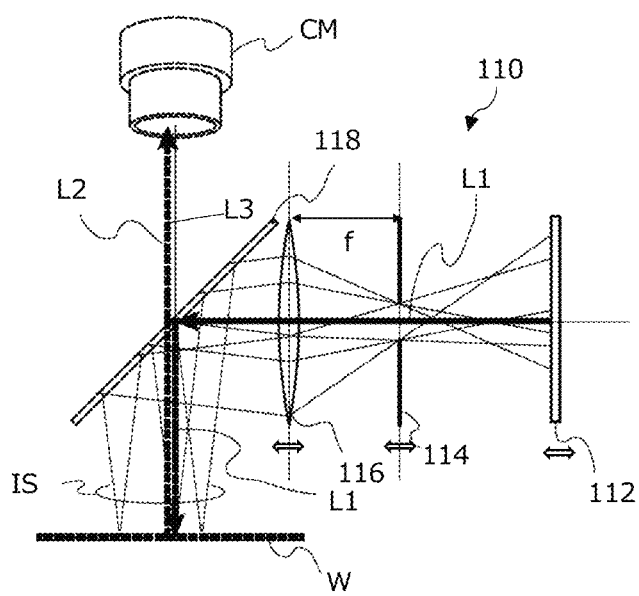
FIG. 2 is a schematic diagram illustrating a main portion of an illumination device of FIG. 1.

As illustrated in FIG. 2, the illumination device 110 includes a light source unit 112 configured to emit the illumination light, a filter unit 114, a lens unit 116 configured to apply the illumination light to the measurement object W at a specific irradiation solid angle IS, and a half mirror 118.

The light source unit 112 may have one or more arranged chip-type LEDs, an organic EL, or a light guide plate with a light from a sidelight. The light source unit 112 is movable along an irradiation optical axis L1.

As illustrated in FIG. 2, the filter unit 114 is disposed between the light source unit 112 and the lens unit 116, and separates the inside of the specific irradiation solid angle IS into a plurality of solid angle regions IS1, IS2, and IS3 (see FIG. 3E) with light wavelength regions (optical attributes) R, G, and B (reference sign R indicates a red wavelength region, reference sign G indicates a green wavelength region, and reference sign B indicates a blue wavelength region), each different from each other. Specifically, as illustrated in FIG. 3A, the filter unit 114 includes an aperture (with a radius of R0) configured to limit the light emitted from the light source unit 112, and filter regions CF1, CF2, and CF3, each different from each other, that are arranged around the irradiation optical axis L1 inside the aperture so that the plurality of solid angle regions IS1, IS2, and IS3 are provided around the irradiation optical axis L1 of the irradiation solid angle IS of the illumination light. Note that, in the present embodiment, the filter regions CF1, CF2, and CF3 are composed of 120-degree fan-shaped red, green, and blue color filters, respectively. As illustrated in FIG. 2, the filter unit 114 is disposed on the irradiation optical axis L1 of the illumination light in the vicinity of a position determined by a focal length f of the lens unit 116. The filter unit 114 is also movable along the irradiation optical axis L1. Note that, in the present embodiment, the filter unit 114 is an optical element in which the aperture, which is a light-shielding mask for blocking the illumination light, and the filters for changing the light wavelength regions are integrated into one unit, but it is not limited to this configuration, and its components may be provided separately. Alternatively, other elements such as a liquid crystal shutter that can electrically change transmittance and color may be used in the filter unit. Although the filter unit is designed to be transmissive, it may be reflective.

As illustrated in FIG. 2, the lens unit 116 applies the illumination light, which is emitted from the light source unit 112 and passes through the filter unit 114, to the measurement object W at a specific irradiation solid angle IS. The lens unit 116 is, for example, a refractive lens, which may be a single lens or may be composed of multiple lenses. The lens unit 116 is also configured to be movable along the irradiation optical axis L1.

As illustrated in FIG. 2, the half mirror 118 is disposed so that the irradiation optical axis L1 and an observation optical axis L2 are aligned and the irradiation light falls coaxially. Therefore, as illustrated in FIGS. 4A and 4B, the irradiation solid angle IS and an observation solid angle DS are formed in the same direction.

Figure 5A:
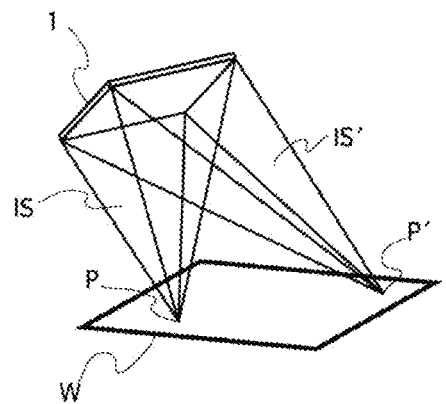
FIG. 5A is a drawing illustrating irradiation solid angles of conventional illumination light.
Figure 5B:
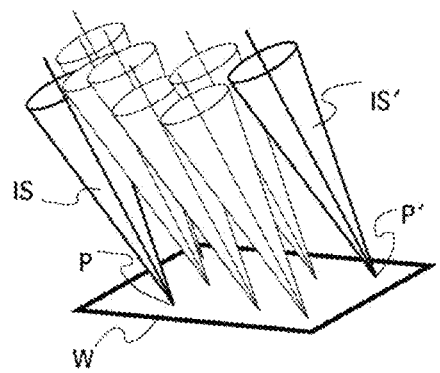
FIG. 5B is a drawing illustrating the irradiation solid angles of illumination light of the present embodiment.

As described above, the light source unit 112, the filter unit 114, and the lens unit 116 can be moved and adjusted and the filter regions of the filter unit 114 can be changed, so that it is possible to form the irradiation solid angle IS of an optional shape with respect to the measurement object W, while arbitrarily changing the light wavelength ranges. Furthermore, since the filter unit 114 is disposed in the vicinity of the position determinded by the focal length f of the lens unit 116, the irradiation light can be applied under the same conditions to every position through the entire field of view of the measurement object W to be imaged by the imaging device CM. Here, FIG. 5A illustrates irradiation solid angles IS and IS' at different positions P and P' of the measurement object W when the measurement object W is irradiated with general conventional illumination LS. According to FIG. 5A, at the positions P and P', the irradiation solid angles IS and IS' have different shapes and different directions of irradiation optical axes. However, according to the illumination device 110 of the present embodiment, as illustrated in FIG. 5B, the measurement object W can be irradiated with the irradiation light under the same conditions at every position throughout the entire field of view of the measurement object W. In other words, the irradiation solid angle IS is the same for each point of the measurement object W. Therefore, the illumination device 110 of the present embodiment can extract minute changes that could not be extracted with conventional illumination.

As illustrated in FIG. 1, the imaging device CM receives object light from the measurement object, which is generated by the illumination light of the illumination device 110, at the predetermined observation solid angle DS by, for example, a telecentric imaging optical system (an imaging optical system with an AF function may be used), and outputs two-dimensional images as color images. In other words, the imaging device CM is, for example, a color CCD camera or a color CMOS camera, and each pixel of the imaging device CM can identify different optical attributes from each other. That is, in the present embodiment, the different optical attributes are different light wavelength regions R, G, and B, and, for example, each pixel is composed of a set of pixel elements (four pixel elements in Bayer pattern) each having color filters red, green, and blue. Note that, the color images are processed by the processing device 120.

Figure 6:
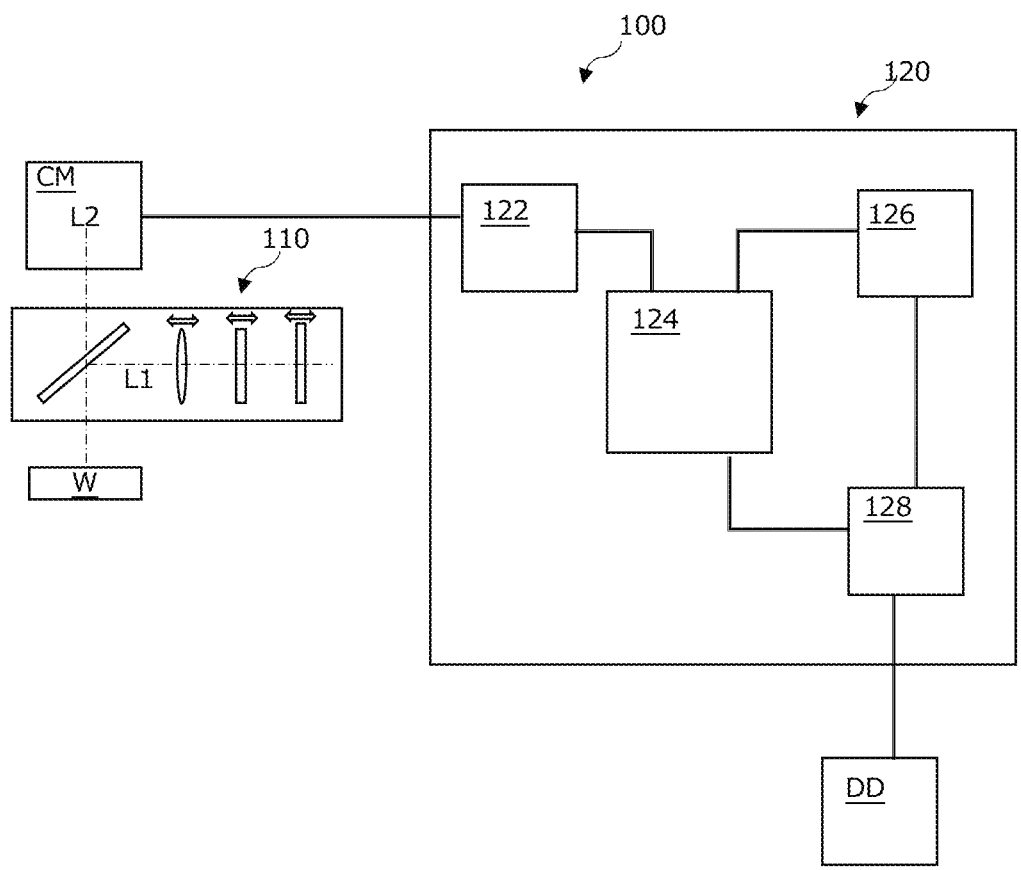
FIG. 6 is a processing block diagram of the image measurement device of FIG. 1.

As illustrated in FIG. 6, the processing device 120 includes an image retention unit 122, an arithmetic unit 124, a memory unit 126, and a shape reconstruction unit 128, and is connected to the imaging device CM and the display device DD. Therefore, the processing device 120 can process the images from the imaging device CM, and outputs display signals to the display device DD. Note that the display device DD can display color images, 3D images, and various types of information on the basis of output of the shape reconstruction unit 128.

The image retention unit 122 is a circuit inside an image capture IMC, and is capable of retaining the images from the imaging device CM in frame units. In the present embodiment, the image retention unit 122 can retain images of the respective light wavelength regions R, G, and B.

The arithmetic unit 124 calculates(obtains) a normal vector Vn at each point of the measurement object W corresponding to each pixel from the inclusion relation between a plurality of solid angle regions RS1, RS2, and RS3, constituting the object light from the measurement object W, and the predetermined observation solid angle DS. The principle thereof will be described using FIGS. 4A and 4B. The solid lines depict the irradiation solid angle IS formed by the irradiation light and the observation solid angle DS by the imaging device CM. The dotted lines depict a reflected solid angle RS formed by the object light. Here, the solid angle regions IS1, IS2, and IS3 of the irradiation solid angle IS correspond to the solid angle regions RS1, RS2, and RS3 of the reflected solid angle RS, respectively (i.e., IS1=RS1, IS2=RS2, and IS3=RS3).

First, in a case in which there is no inclination in the measurement object W, as illustrated in FIG. 4A, a reflection optical axis L3 coincides with the observation optical axis L2. In other words, when the illumination light with the irradiation solid angle IS is applied to the measurement object W, the luminances Rc, Gc, and Bc of the light wavelength ranges R, G, and B corresponding to the solid angle regions RS1, RS2, and RS3 of the reflected solid angle RS by the object light are equally detected in the observation solid angle DS. Therefore, a not-inclined normal vector Vn can be obtained on the basis of the ratio between the detected luminances Rc, Gc, and Bc of the light wavelength ranges R, G, and B.

On the other hand, in a case in which there is an inclination (angle φ) in the measurement object W, as illustrated in FIG. 4B, the reflection optical axis L3 and the observation optical axis L2 do not coincide with each other. In other words, when the illumination light with an irradiation solid angle IS is applied to the measurement object W, the luminance Rc of the light wavelength range R corresponding to the solid angle region RS1 of the reflected solid angle RS by the object light cannot be received within the range of the observation solid angle DS. On the other hand, the luminances Gc and Bc of the light wavelength regions G and B corresponding to the solid angle regions RS2 and RS3 are detected almost equally. Therefore, an inclined normal vector Vn can be obtained on the basis of the ratio between the detected luminances Rc, Gc, and Bc of the light wavelength ranges R, G, and B.

In other words, the arithmetic unit 124 can calculate the normal vector Vn on the basis of the correspondence relation between the optical attributes (in the present embodiment, each of the light wavelength regions R, G, and B) and the normal vector Vn.

Note that the normal vector Vn is represented as (Vnx, Vny, Vnz), and is normalized by the arithmetic unit 124. That is, the relation between the values Vnx, Vny, and Vnz is as follows.

$$Vnx*Vnx+Vny*Vny+Vnz*=1 \qquad (1)$$

In the present embodiment, the correspondence relation between the light wavelength ranges R, G, and B and the normal vector Vn is also obtained by the arithmetic unit 124. The correspondence relation can be obtained using a correspondence table and complementary functions fx and fy. In the present embodiment, the complementary functions fx and fy are defined to obtain the normal vector Vn between discrete values of the correspondence table.

Figures 9, 10:
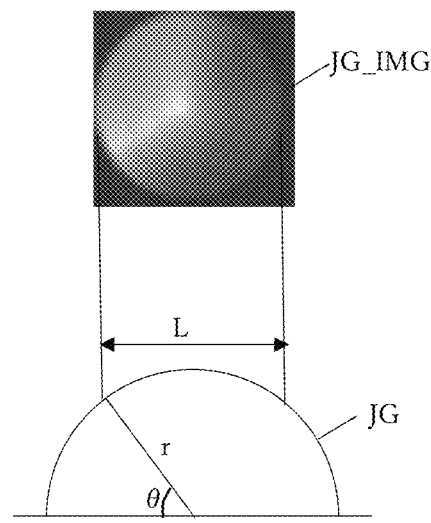
FIG. 9 is a schematic diagram illustrating a reference sphere used in the preliminary step illustrated in FIG. 8 and a range of inclination of the normal vector to be obtained.
FIG. 10 is an example of a correspondence table showing the correspondence relation between optical attributes and the normal vector obtained in the preliminary step illustrated in FIG. 8.

The memory unit 126 can store various initial values, various programs, various tables, various functions, and various types of data. For example, the memory unit 126 stores the correspondence relation between the light wavelength ranges R, G, and B and the normal vector Vn of the measurement object W. In the present embodiment, the correspondence relation between the light wavelength regions R, G, and B and the normal vector Vn is configured as illustrated in FIG. 10 on a correspondence table, and the correspondence table is stored in the memory unit 126. Note that, the reference signs Rt, Gt, and Bt in FIG. 10 indicate the luminances (0≤Rt, Gt, Bt≤100) of the light wavelength regions R, G, and B recorded in the correspondence table, respectively. The reference signs Vtnx and Vtny are an X component and a Y component of a normalized normal vector Vtn recorded in the correspondence table, respectively. In the present embodiment, the memory unit 126 further stores the complementary functions fx and fy obtained from the correspondence table.

The shape reconstruction unit 128 calculates inclination information for each point of the measurement object W from the normal vector Vn obtained by each pixel, and reconstructs the shape of the measurement object W. Specifically, the shape reconstruction unit 128 reconstructs the shape of the measurement object W by converting the normal vector Vn into the inclination information of each pixel and connecting the inclination information at pixel intervals. The inclination information and shape information is output to the display device DD and stored in the memory unit 126.

Figure 7:
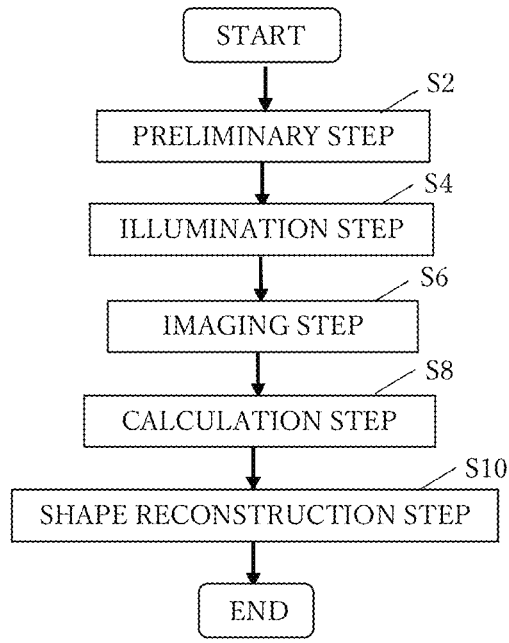
FIG. 7 is a flowchart illustrating a procedure of shape reconstruction by the image measurement device of FIG. 1.
Figure 8A:
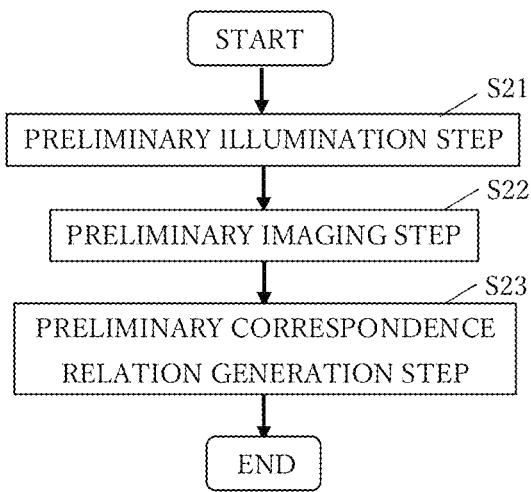
FIG. 8A is an overall flowchart of a preliminary step of FIG. 7.
Figure 8B:
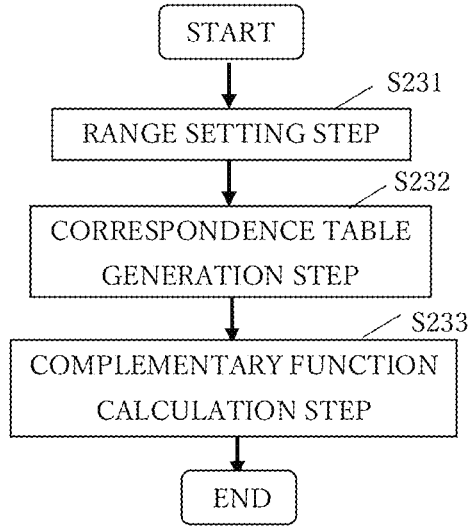
FIG. 8B is a detailed flowchart illustrating a preliminary correspondence relation generation step illustrated in FIG. 8A.

Next, a procedure for reconstructing the shape of the measurement object W by the image measurement device 100 will be described below using FIGS. 7, 8A, and 8B.

First, a preliminary step (FIG. 7, step S2) is performed.

Here, the preliminary step will be described in detail using FIGS. 8A and 8B.

The preliminary step is a step of calculating in advance the correspondence relations between the light wavelength ranges R, G, and B and the normal vector Vn to reconstruct the shape of the measurement object W. As illustrated in FIG. 8A, the preliminary step includes a preliminary illumination step, a preliminary imaging step, and a preliminary correspondence relation generation step. Note that, in the preliminary step of the present embodiment, a reference sphere (a specific jig) is used instead of the measurement object W. The reference sphere indicates a sphere whose size (with a radius r) is measured and valued such that the accuracy of the reference sphere does not affect the variations to be obtained in normal vectors. It is preferable that the material and surface treatment of the reference sphere are the same as those of the measurement object W to be measured.

First, the preliminary illumination step (FIG. 8A, step S21) is performed. In the preliminary illumination step, the illumination light having the specific irradiation solid angle IS including the plurality of solid angle regions IS1, IS2, and IS3 with the light wavelength ranges R, G, and B, each different from each other, is applied by the illumination device 110 to the reference sphere. Note that, in the present embodiment, the use of the illumination device 110 allows the irradiation solid angle IS to be uniform at each point of the reference sphere.

Next, the preliminary imaging step (FIG. 8A, step S22) is performed. In the preliminary imaging step, an image is captured by receiving object light from the reference sphere generated by the illumination light at a predetermined observation solid angle DS.

Next, the preliminary correspondence relation generation step (FIG. 8A, step S23) is performed. The preliminary correspondence relation generation step is a step in which the arithmetic unit 124 calculates the correspondence relation between the light wavelength ranges R, G, and B and the normal vector Vn. The preliminary correspondence relation generation step includes a range setting step, a correspondence table generation step, and a complementary function calculation step.

Specific procedures will be described below using FIGS. 8B, 9, and 10.

First, the range setting step (FIG. 8B, step S231) is performed. In the range setting step, as illustrated in FIG. 9, a range in which the direction of the normal vector Vn can be determined is calculated from a captured image JG_IMG of the reference sphere. For example, a pixel region with high luminance that exceeds noise level is extracted from the image JG_IMG of the reference sphere, or a pixel region is extracted from the image JG_IMG of the reference sphere by differential processing when turning on/off the illumination device 110, to obtain a range L from which the object light from the reference sphere is reflected. Then, a reference sign θ represents a maximum surface inclination angle at the reference sphere (with a radius r) and the reference sign θ can be obtained by using the range L as follows.

$$\theta = acos((L/2)/r) \quad (2)$$

Next, the correspondence table generation step (FIG. 8B, step S232) is performed. In the correspondence table generation step, a correspondence table between the light wavelength ranges R, G, and B and the normal vector Vn is generated for each pixel in the object light measurable range in the image JG_IMG of the reference sphere. Cx and Cy represent the center of a sphere projection image on the image JG_IMG of the reference sphere, and X and Y represent pixel coordinates of the object light measurable range. Px and Py represent lengths corresponding to pixel sizes of the image JG_IMG of the reference sphere in X and Y directions. The normal vector V(Vx, Vy, Vz) is obtained as follows.

$$Vx = (X-Cx)*Px \quad (3)$$

$$Vy = (Y-Cy)*Py \quad (4)$$

$$Vz = sqrt(r*r - Vx*Vx - Vy*Vy) \quad (5)$$

By normalizing these, the normal vector Vn is obtained as follows.

$$Vnx = Vx/r \quad (6)$$

$$Vny = Vy/r \quad (7)$$

$$Vnz = sqrt(1 - Vnx*Vnx - Vny*Vny) \quad (8)$$

Therefore, the correspondence table illustrated in FIG. 10 can be generated by obtaining an X component Vnx and a Y component Vny of the normal vector Vn with respect to luminances Rc, Gc, and Bc of the light wavelength ranges R, G, and B at the pixel coordinates X and Y of the image JG_IMG of the reference sphere (in the correspondence table, the reference signs Rc, Gc, Bc, Vnx, and Vny are changed to reference signs Rt, Gt, Bt, Vtnx, and Vtny, respectively).

Next, the complementary function calculation step (FIG. 8B, step S233) is performed. In the complementary function calculation step, complementary functions fx and fy are obtained from the correspondence table. Specifically, first, the luminances Rt, Gt, and Bt of the light wavelength range R, G, and B in the correspondence table are normalized to have two variables (e.g., only luminance rates Rn and Gn), as represented below.

$$Rn = Rt/sqrt(Rt*Rt + Gt*Gt + Bt*Bt) \quad (9)$$

$$Gn = Gt/sqrt(Rt*Rt + Gt*Gt + Bt*Bt) \quad (10)$$

$$Bn = sqrt(1 - (Rt*Rt)/(Rt*Rt + Gt*Gt + Bt*Bt) + (Gt*Gt)/(Rt*Rt + Gt*Gt + Bt*Bt)) \quad (11)$$

The Z component Vnz of the normal vector Vn is then assumed to be only positive. Under these conditions, the complementary function fx (or fy) with the luminance rates Rn and Gn as variables is obtained so that the X component Vtnx (for fy, the Y component Vtny) of the normal vector Vn in the correspondence table is obtained. The complementary functions fx and fy can be obtained, for example, by using spline interpolation for fitting freeform surfaces. Note that, to obtain the complementary functions fx and fy, N (N≥4) correspondence relations are used. The obtained complementary functions fx and fy are stored in the memory unit 126.

This completes the preliminary correspondence relation generation step, and the preliminary step is also completed.

Next, returning to FIG. 7, an illumination step (FIG. 7, step S4) is performed. In the illumination step, the illumination light having the specific irradiation solid angle IS with the plurality of solid angle regions having light wavelength ranges R, G, and B, each different from each other, is applied to the measurement object W. In the present embodiment, the use of the illumination device 110 allows the irradiation solid angle IS to be uniform at each point of the measurement object W.

Next, an imaging step (FIG. 7, step S6) is performed. In the imaging step, the object light from the measurement object W generated by the illumination light is received at the predetermined observation solid angle DS and an image is captured.

Next, a calculation step (FIG. 7, step S8) is performed. In the calculation step, on the basis of the light wavelength regions R, G, and B identified in each pixel of the image, the normal vector Vn at each point of the measurement object W corresponding to each pixel is obtained from the inclusion relation between the plurality of solid angle regions RS1 (IS1), RS2 (IS2), and RS3 (IS3) constituting the object light and the predetermined observation solid angle DS.

Specifically, the correspondence table is read out of the memory unit 126. In a case in which the luminances Rc, Gc, and Bc of the identified light wavelength ranges R, G, and B coincide with the luminances Rt, Gt, and Bt of the light wavelength ranges R, G, and B of the correspondence table, the corresponding normal vector Vn, as is, becomes a normal vector to be obtained. In a case in which the luminances Rc, Gc, and Bc of the identified light wavelength ranges R, G, and B do not coincide with the luminances Rt, Gt, and Bt of the light wavelength ranges R, G, and B of the correspondence table, the luminance rates Rn and Bn are obtained by normalizing the luminances Rc, Gc, and Bc of the identified light wavelength ranges R, G, and B. Then, the complementary functions fx and fy are read out of the memory unit 126, and the corresponding normal vector Vn is calculated.

Note that, without using the correspondence table, the luminance rates Rn and Bn are obtained by normalizing the luminances Rc, Gc, and Bc of the immediately identified light wavelength regions R, G, and B. Then, the complementary functions fx and fy are read out of the memory unit 126, and the corresponding normal vector Vn may be calculated.

Alternatively, even in a case in which the luminances Rc, Gc, and Bc of the identified light wavelength ranges R, G, and B do not coincide with the luminance Rt, Gt, and Bt of the light wavelength ranges R, G, and B of the correspondence table, the corresponding normal vector Vn may be calculated approximately using multiple correspondence relations in the correspondence table without using the complementary functions fx and fy. This will be described below.

For example, first, the sum of squares of luminance difference SUM between the luminances Rt, Gt, and Bt and the luminances Rc, Gc, and Bc is obtained for M (M sets) in the correspondence table that can be determined to be values close to the luminances Rc, Gc, and Bc of the identified light wavelength ranges R, G, and B (M≥N≥4, where M may be the number of sets where all luminances in the correspondence table are used).

$$SUM=(Rc-Rt)*(Rc-Rt)+(Gc-Gt)*(Gc-Gt)+(Bc-Bt)*(Bc-Bt) \quad (12)$$

Next, in the order in which the sum of squares of luminance difference SUM is closest to zero, N (N sets) of luminances Rt, Gt, and Bt are selected. Then, N normal vectors Vn corresponding to these are obtained from the correspondence table.

Then, by averaging the obtained N normal vectors Vn, the normal vector for the luminances Rc, Gc, and Bc of the identified light wavelength regions R, G, and B may be obtained.

Then, a shape reconstruction step (FIG. 7, step S10) is performed. In the shape reconstruction step, the shape of the measurement object W is reconstructed, by obtaining inclination information for each point of the measurement object W from the normal vector Vn, in consideration of the pixel size.

In this way, in present embodiment, the illumination light having the specific irradiation solid angle IS including the plurality (three) of solid angle regions IS1, IS2, and IS3 with light wavelength ranges R, G, and B, each different from each other, is applied to the measurement object W. Then, on the basis of the light wavelength regions R, G, and B identified at each pixel of the image, the normal vector Vn at each point of the measurement object W corresponding to each pixel is obtained from the inclusion relation between the plurality of solid angle regions RS1, RS2, and RS3 constituting the object light and the predetermined observation solid angle DS. Therefore, it is possible to detect each of the wavelength regions R, G, and B with appropriate luminance at each pixel, and to stably obtain the normal vector Vn with high accuracy. At the same time, since the shape of the measurement object W is reconstructed from the normal vectors Vn, the shape can be quickly reconstructed with high accuracy.

In addition, in the present embodiment, the filter unit 114 is disposed in the vicinity of the position determined by the focal length f of the lens unit 116 on the irradiation optical axis L1, and the irradiation solid angle IS is made uniform at each point of the measurement object W. Therefore, homogeneous information can be taken from every point of the measurement object W into the image to be captured. In other words, information on the surface of the measurement object W can be equally quantified, regardless of location, to reconstruct and evaluate the shape. Not limited to this, the filter unit does not have to be disposed in the vicinity of the position determined by the focal length f of the lens unit on the irradiation optical axis L1. This is because, depending on the measurement object W, it may be sufficient to obtain highly accurate information only for each point of the measurement object W in the extreme vicinity of the irradiation optical axis L1.

In the present embodiment, the filter unit 114 includes the filter regions CF1, CF2, and CF3, each different from each other, around the irradiation optical axis L1 so that the plurality of solid angle regions IS1, IS2, and IS3 are provided around the irradiation optical axis L1 of the illumination light. Therefore, when there are a plurality of normal vectors Vn that have the same inclination angle with the irradiation optical axis L1 as the rotation axis, the plurality of normal vectors Vn can be obtained distinctly. In other words, the inclination of the surface of the measurement object (the direction of the inclination angle with the irradiation optical axis L1 as the rotation axis) can be faithfully reproduced from the normal vector Vn.

Specifically, the filter unit 114 illustrated in FIG. 3A is used in the present embodiment, but not limited to this, and may be as illustrated in FIG. 3B. In this case, the filter unit 114 includes a uniform filter region CF4 only in the vicinity of the irradiation optical axis L1, and the filter regions CF1, CF2, and CF3 that are the same as those in FIG. 3A. Therefore, the use of the filter unit 114 can eliminate a manhour for detecting slight inclinations of the normal vectors Vn and obtaining the normal vectors Vn, so that it is possible to detect only necessary inclinations.

Alternatively, the filter unit 114 can be configured as illustrated in FIG. 3D. In this case, the filter unit 114 includes concentric two filter regions, each filter region is similar to FIG. 3A. In other words, this filter unit 114 includes filter regions CF21, CF22, and CF23, each different from each other, around the irradiation optical axis L1, and further includes filter regions CF11, CF12, and CF13, each different from each other, outside thereof. Therefore, the use of this filter unit 114 can detect the inclinations of the normal vectors Vn more finely than the filter unit 114 of FIG. 3A.

As a matter of course, the filter unit 114 may be configured as illustrated in FIG. 3C. In this case, in contrast to FIG. 3A, the filter unit 114 includes filter regions CF1, CF2, CF3, and CF4, each different from each other, that are concentrically arranged with respect to the irradiation optical axis L1. In other words, with the use of this filter unit 114, when there are a plurality of normal vectors that have the same inclination angle with respect to the irradiation optical axis L1, the steepness of the inclination angles is finely obtained without distinguishing the normal vectors. Therefore, although there is no information on the direction of rotation around the irradiation optical axis L1, it is possible to reduce processing time and manhours for shape reconstruction when determining whether the measurement object W is defective, which facilitates such determination.

FIGS. 3F to 3H illustrate irradiation solid angles IS and solid angle regions IS1, IS2, IS3, IS4, IS11, IS12, IS13, IS21, IS22, and IS23 of the filter units 114 of FIGS. 3B to 3D.

In the present embodiment, the filter unit 114 is also used to allow the light wavelength regions R, G, and B, as optical attributes, to be different from each other. Therefore, when the normal vector Vn is not inclined (there is no inclination in the measurement object W), the light is white, and it is easy to intuitively visually recognize that the measurement object W is not inclined. In addition, since the light is white when there is no inclination, the color of the measurement object W itself, which is facing forward, can be easily determined. At the same time, as the imaging device CM, an ordinary color CDD camera or color CMOS camera can be used as is. Therefore, identification of the optical attributes can be achieved easily and at low cost. Not limited to this, the light wavelength ranges do not have to be three of R, G, and B, but may be at least two. The colors of the light wavelength ranges do not have to be the red wavelength range, the green wavelength range, and the blue wavelength range, but may be a combination of the wavelength regions of different colors.

Note that the optical attributes include polarization states, luminance, or the like, other than the light wavelength regions R, G, and B. That is, for example, the optical attributes may be polarization states. In this case, for example, a polarizer or the like that changes the polarization states of light is used in the filter unit. The imaging device CM may then identify the optical attributes by using a corresponding polarizer.

Also, the present embodiment has the preliminary step before the illumination step. In the preliminary step, the preliminary illumination step and the preliminary imaging step are performed while the reference sphere is used as a specific jig instead of the measurement object W. In addition to these, the preliminary correspondence relation generation step to obtain the correspondence relations between the light wavelength ranges R, G, and B and the normal vector Vn is performed. In other words, since the correspondence relations between the light wavelength regions R, G, and B and the normal vector Vn are obtained in advance, it is possible to image the measurement object W and to measure and reconstruct its shape quickly and stably. At the same time, when determining the correspondence relations between the light wavelength regions R, G, and B and the normal vector Vn, arrangement and configuration in measurement of the measurement object W by the image measurement device 100 can be used as is, except for replacing the measurement object W with the specific jig. Therefore, the steps from the preliminary step to the shape reconstruction step can be performed efficiently and quickly. Furthermore, since the specific jig is the reference sphere, it is sufficient to perform the preliminary imaging step only once, and the correspondence relations between the light wavelength ranges R, G, and B and the normal vector Vn can be easily and quickly obtained.

Not limited to this, but the preliminary step may be omitted. In that case, in the calculation step, the correspondence relations between the light wavelength regions R, G, and B and the normal vector Vn may be obtained and the normal vector may be obtained. Alternatively, once the light wavelength regions R, G, and B are identified, an operator can directly specify the normal vector in the most dominant light wavelength region using an input device not illustrated in the drawing, or, for example, the operator can specify the normal vector using any simulation, such as a light ray tracking method. Alternatively, the preliminary step may be performed in a different configuration or by a different method. For example, an apparatus different from the image measurement device 100 may be used, or a different illumination device and imaging device CM may be used in the image measurement device 100.

Alternatively, a reference plane, rather than the reference sphere, may be used as the specific jig. (Note that the reference plane used herein is a plane having a surface whose undulation or roughness is negligible with respect to the inclination of a normal vector to be measured. The measurement object W may be exactly what is about to be measured, or may be another object of the same shape, or of a completely different shape).

For example, when the reference plane is used as the specific jig, the following steps are performed.

First, the illumination device 110 applies light to the reference plane and images of the reference plane are captured. At this time, the reference plane is imaged multiple times (N≥4) at different inclination angles with respect to the observation optical axis L2. Then, normal vectors Vn corresponding to the inclined angles are obtained. Then, the luminances Rc, Gc, and Bc of the light wavelength regions R, G, and B corresponding to the respective normal vectors Vn are calculated. The luminances Rc, Gc, and Bc are obtained by taking an average thereof in only portions of the reference plane in the captured image. Thereby, a correspondence table that represents the correspondence relations between the light wavelength region R, G, and B and the normal vector, as illustrated in FIG. 10, is obtained. Note that the procedure described here indicates the steps of FIGS. 8A and 8B, excluding step S233.

As a matter of course, the measurement object W itself may be used as is. In that case, the following steps are performed.

First, the illumination device 110 applies light to the measurement object W to determine a temporary reference plane. For example, this temporary reference plane can be determined by calculating the amount of change in luminance Rc, Gc, and Bc of light wavelength ranges R, G, and B in portions of the measurement object W in the images and finding an area with the least amount of change. Once this temporary reference plane is determined, the remaining steps are identical to those in the case of using the reference plane described above. Therefore, further explanation is omitted.

In the present embodiment, the processing device 120 includes the memory unit 126 that stores the correspondence relations between the light wavelength ranges R, G, and B and the normal vector Vn, and the arithmetic unit 124 calculates the normal vector Vn on the basis of the correspondence relations. Therefore, even when the correspondence relations are complex, the correspondence relations can be read out and used appropriately in the arithmetic unit 124. In addition, the correspondence relations are configured as the correspondence table. Therefore, the amount of calculation in the arithmetic unit 124 can be reduced, and the normal vector Vn can be quickly obtained. At the same time, the correspondence relations are also configured as the complementary functions fx and fy. Therefore, by using the complementary functions fx and fy, the normal vector Vn can be quickly obtained for the luminances Rc, Gc, and Bc of the light wavelength ranges R, G, and B the correspondence of which is not in the correspondence table.

Not limited to this, it is not necessary for the processing device to have a memory unit. In such a case, the above-described correspondence relations may be read directly from the outside into the arithmetic unit. Alternatively, it may be configured such that the correspondence relations are obtained each time the normal vector Vn is obtained. Alternatively, only the complementary functions fx and fy may be configured without configuring the correspondence table. Alternatively, the correspondence table may be configured and the complementary functions fx and fy may not be configured. Alternatively, neither the correspondence table nor the complementary functions fx and fy may be configured. In this case, the operator may directly determine the normal vector for the luminances Rc, Gc, and Bc of the obtained light wavelength regions R, G, and B.

In the present embodiment, the normal vector Vn is normalized. Therefore, it is possible to reduce the number of parameters for obtaining the correspondence table and the complementary functions fx and fy that define the correspondence relations between the light wavelength regions R, G, and B and the normal vector Vn. Therefore, the storage capacity required for the correspondence table can be reduced, and the amount of calculation for the complementary functions fx and fy can be reduced. Not limited to this, un-normalized normal vectors V may also be used.

In other words, in the present embodiment, it is possible to quickly reconstruct the information for each point of the measurement object W in the captured image of the measurement object W.

Figure 11:
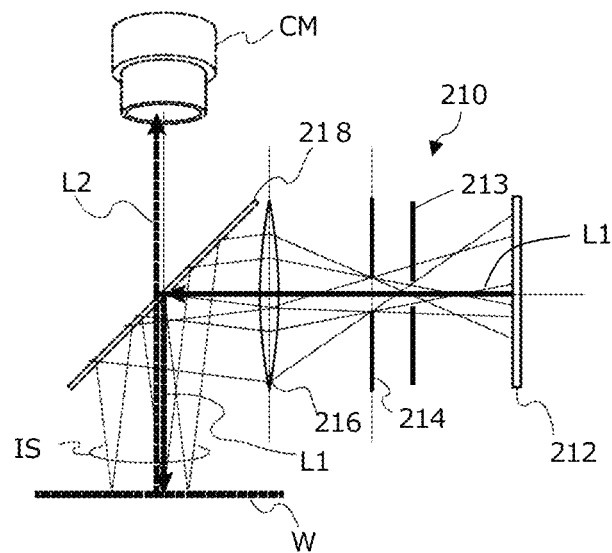
FIG. 11 is a schematic diagram illustrating a main portion of an illumination device of an image measurement device according to a second embodiment of the present invention.

In the first embodiment, the illumination device 110 includes the light source unit 112, the filter unit 114, the lens unit 116, and the half mirror 118, but the present invention is not limited to this. For example, it may be configured as that in a second embodiment illustrated in FIG. 11. In the second embodiment, in contrast to the first embodiment, a second filter 213 is further provided between a light source unit 212 and a filter unit 214. Thus, components other than the second filter unit 213 are indicated with reference numerals whose first digits are changed, and the description of the elements is omitted.

In the present embodiment, the second filter unit 213 is disposed, on the irradiation optical axis L1, between the light source unit 212 and the filter unit 214. The second filter unit 213, as with the filter unit 214, has an aperture for blocking illumination light and filter regions for changing optical attributes. The second filter unit 213 is disposed in the vicinity of a position determined by a focal point such that its image is formed on the surface of the measurement object W. Therefore, the second filter unit 213 can homogenize the illumination light, change complex optical attributes, and the like, as well as can prevent any stray light.

Figure 12:
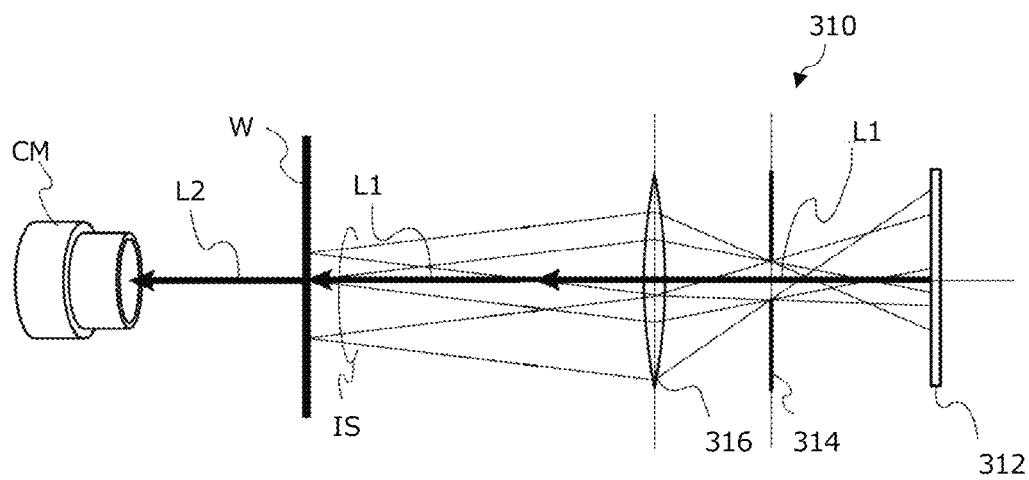
FIG. 12 is a schematic diagram illustrating the relation between an illumination device of an image measurement device according to a third embodiment of the present invention and a measurement object.

In the above-described embodiment, the image measurement device receives the reflected light of the measurement object W as the object light to measure the measurement object W, but the present invention is not limited to this. For example, the image measurement device may be configured as in a third embodiment illustrated in FIG. 12. In the third embodiment, in contrast to the above-described embodiment, light transmitted through the measurement object W is received as object light and the measurement object W is measured. Therefore, in the present embodiment, it is possible to measure and reconstruct the shape of the measurement object W even when the measurement object W is made of a material that is difficult to reflect illumination light but easy to transmit the light.

Figure 13:
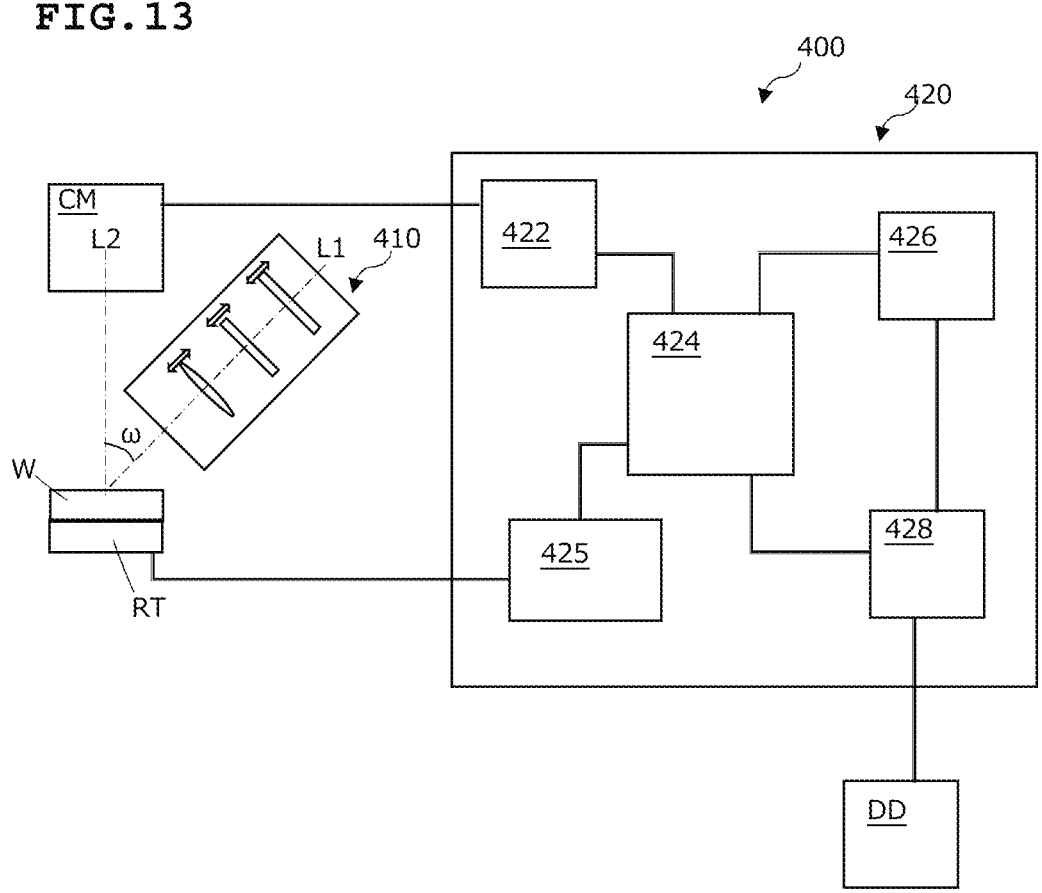
FIG. 13 is a processing block diagram of an image measurement device according to a fourth embodiment of the present invention.

Note that, in the above-described embodiment, the irradiation optical axis L1 and the observation optical axis L2 are coaxial, but the present invention is not limited to this. For example, the image measurement device may be configured as in a fourth embodiment illustrated in FIGS. 13 and 14. In the fourth embodiment, in contrast to the above-described embodiment, the irradiation optical axis L1 and the observation optical axis L2 intersect on the surface of the measurement object W. As a result of the configuration in which the irradiation optical axis L1 and the observation optical axis L2 intersect at an angle co on the surface of the measurement object W, some components are changed or added. The components other than those that have been changed or added are indicated with reference numerals whose first digits are changed, and the description of the components is omitted.

In the present embodiment, a rotary table RT that can rotate the measurement object W around the observation optical axis L2 is provided. The processing device 420 includes an image retention unit 422, an arithmetic unit 424, a control unit 425, a memory unit 426, and a shape reconstruction unit 428. In the present embodiment, in the processing device 420, only the control unit 425 differs from the above-described embodiment, and thus, only the control unit 425 will be described. The control unit 425 outputs, to the rotary table RT, a signal for controlling the rotary drive of the rotary table RT. Note that a rotation angle is designated by a not-illustrated input device or a program stored in the memory unit 426. The control unit 425 also outputs a rotation angle signal of the rotary table RT to the arithmetic unit 424. The arithmetic unit 424 establishes correspondence between the rotation angle signal of the rotary table RT and an image obtained at that time, and obtains a normal vector at each point of the measurement object corresponding to each pixel from the inclusion relation between the plurality of solid angle regions IS1, IS2, and IS3 and the predetermined observation solid angle DS.

Figure 14:
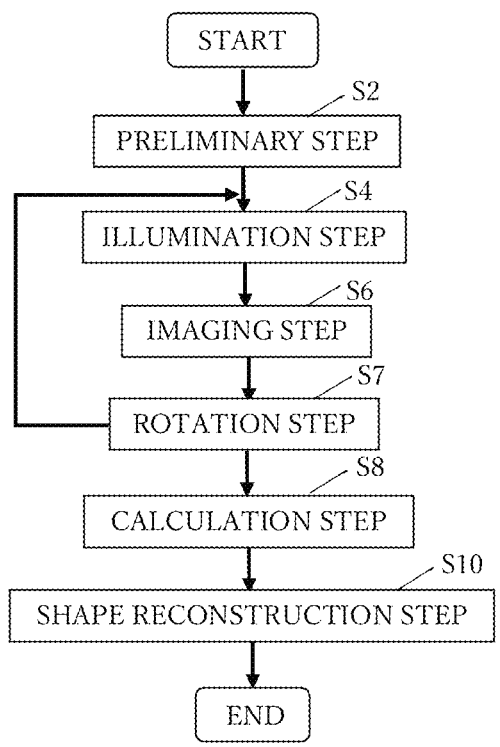
FIG. 14 is a flowchart illustrating a procedure of shape reconstruction by the image measurement device of FIG. 13.

Next, a procedure for reconstructing the shape of the measurement object W by an image measurement device 400 will be described below using FIG. 14. The details of a preliminary step, an illumination step, an imaging step, a calculation step, and a shape reconstruction step are the same as those in the first embodiment, so the description thereof is omitted.

First, the preliminary step (FIG. 14, step S2) is performed. Then, the illumination step (FIG. 14, step S4) is performed. Then, the imaging step (FIG. 14, step S6) is performed.

Next, a rotation step (FIG. 14, step S7) is performed. In the present embodiment, a plurality of solid angle regions IS1, IS2, and IS3 by an illumination device 410 are not rotationally symmetrical with respect to the observation optical axis L2 of the observation solid angle DS. Therefore, in the rotation step, the measurement object W is rotated at a predetermined angle θ1 around the observation optical axis L2 for each imaging step. Note that, the predetermined angle θ1 is a plane angle or less where the plane angle occupies when the irradiation solid angle IS of the illumination device 410 is projected onto the surface of the measurement object W. This rotation step includes performing the calculation step after the above-described illumination step and imaging step (even when illumination conditions do not change after the rotation step, performing the imaging step is only required) are performed a predetermined number NN of times. The predetermined number NN of times satisfies the following equation.

$$NN = 360/\theta 1 \tag{13}$$

Next, the calculation step (FIG. 14, step S8) is performed. In the calculation step, the normal vector Vn is obtained in consideration of the angle ω, at which the irradiation optical axis L1 and the observation optical axis L2 intersect, and the predetermined angle θ1. Then, the shape reconstruction step (FIG. 14, step S10) is performed.

In this way, according to the present embodiment, even when there is a large inclination on the surface of the measurement object W, the inclination can be isotropically measured and reconstructed without depending on the direction of measurement.

Note that, the rotary table RT is effective even with coaxially falling illumination light in which the irradiation optical axis L1 and the observation optical axis L2 coincide with each other. For example, in a case in which the filter regions of the filter unit are not rotationally symmetrical around the irradiation optical axis L1, there is a risk of directional dependence in the measurement accuracy of the normal vector Vn. Therefore, by using such a rotary table RT in the image measurement device as in the first embodiment, it is possible to improve the directional dependence in the measurement accuracy of the normal vector Vn.

Figure 15:
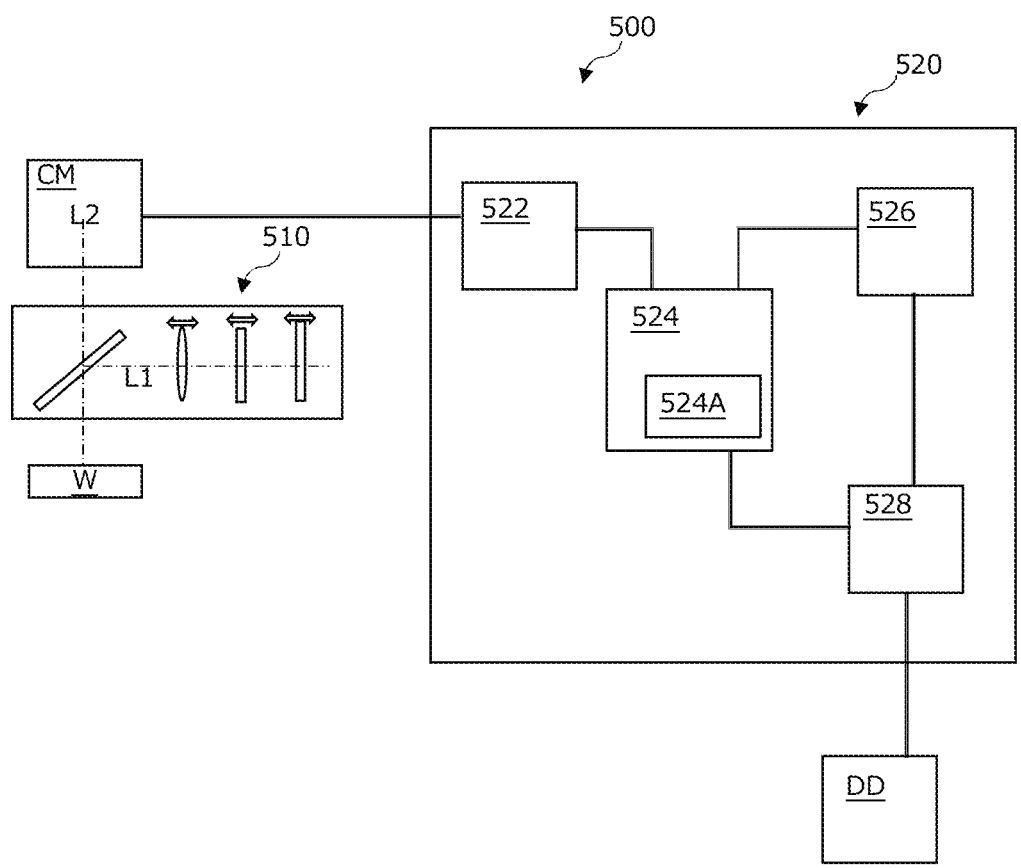
FIG. 15 is a processing block diagram of an image measurement device according to a fifth embodiment of the present invention.

In the image measurement device of the above-described embodiment, the image of the measurement object W is processed to measure and reconstruct the shape of the measurement object, but the present invention is not limited to this. For example, the image measurement device may be configured as in a fifth embodiment illustrated in FIG. 15. In the fifth embodiment, in contrast to the above-described embodiment, an arithmetic unit 524 further includes a consistency determination unit 524A configured to compare a normal vector Vnb at each point of the measurement object W stored in advance with a normal vector Vn at each point obtained from the measurement object W newly imaged, and extracts portions, each different from each other. Thus, components other than the arithmetic unit 524 related to the functions of the consistency determination unit 524A, a memory unit 526, and the shape reconstruction unit 528 are indicated with reference numerals whose first digits are changed, and the description of the components is omitted.

The arithmetic unit 524 first calculates all normal vectors for the measurement object W, and establishes correspondence between each normal vector and each pixel in two dimensions (XY plane) (this is called a normal vector group). Next, this normal vector group is rotated 360 times in 1 deg increments, for example, and is stored in the memory unit 526. In other words, 360 normal vector groups are stored in the memory unit 526 (normal vectors Vn are normalized in advance). These are the normal vector Vn at each point of the measurement object W that is stored in advance.

When an image of the measurement object W is newly captured, the arithmetic unit 524 obtains a normal vector Vn at each point of the measurement object W. Then, the arithmetic unit 524 establishes correspondence between the normal vector Vn and each pixel in two dimensions (XY plane) to constitute a normal vector group. Then, the arithmetic unit 524 calculates the sum of squares of difference between the normal vector group and the 360 normal vector groups stored in the memory unit 526 in advance (pattern matching), and reads one of the normal vector groups with the smallest value (in the case of the best pattern matching) in the consistency determination unit 524A. The consistency determination unit 524A then compares the best pattern matching normal vector group read out of the memory unit 526 with the newly calculated normal vector group. Then, the consistency determination unit 524A obtains portions where the normal vectors Vn differ from each other, and calculates the difference of the normal vectors at the different portions. In a case in which the difference is equal to or greater than a certain threshold value, the consistency determination unit 524A adds information that the position is a defect (this is referred to as defect information). Then, the consistency determination unit 524A outputs the defect information and the newly calculated normal vector group to the shape reconstruction unit 528.

On the basis of the output from the consistency determination unit 524A, the shape reconstruction unit 528 reconstructs the shape of the measurement object W with the defect information. Alternatively, the shape reconstruction unit 528 reconstructs a portion indicated by the defect information and the defect information.

In this way, in the present embodiment, the provision of the consistency determination unit 524A allows to discriminate the different portion between the measurement objects W, and easily detect the defect.

INDUSTRIAL APPLICABILITY

This invention can be widely applied to a shape reconstruction method that reconstructs the shape of a measurement object by applying illumination light to the measurement object and processing an image, and an image measurement device using the shape reconstruction method.

REFERENCE SIGNS LIST 100, 400, 500 . . . image measurement device
110, 210, 310, 410, 510 . . . illumination device
112, 212, 312 . . . light source unit
114, 214, 314 . . . filter unit
116, 216, 316 . . . lens unit
118, 218 . . . half mirror
120, 420, 520 . . . processing device
122, 422, 522 . . . image retention unit
124, 424, 524 . . . arithmetic unit
126, 426, 526 . . . memory unit
128, 428, 528 . . . shape reconstruction unit
213 . . . second filter unit
425 . . . control unit
524A . . . consistency determination unit
B, G, R . . . wavelength range
Bc, Bt, Gc, Gt, Rc, Rt . . . luminance
Bn, Gn, Rn . . . luminance rate
CF1, CF2, CF3, CF4, CF11, CF12, CF13, CF21, CF22, CF23 . . . filter region
CM . . . imaging device
Cx, Cy . . . center of sphere projection image
DD . . . display device
DS . . . observation solid angle
DS1, DS2, DS3, IS1, IS2, IS3, IS4, IS5, IS11, IS12, IS13, IS21, IS22, IS23, RS1, RS2, RS3 . . . solid angle region
f . . . focal length
fx, fy . . . complementary function
IMC . . . image capture
IMP . . . image processing device
IS, IS' . . . irradiation solid angle
JG . . . reference sphere
JG IMG . . . image of reference sphere
L . . . range
L1 . . . irradiation optical axis
L2 . . . observation optical axis
L3 . . . reflection optical axis
LS . . . conventional illumination
M, NN, N . . . time
P, P' . . . position r, R0 . . . radium
RS . . . reflected solid angle
RT . . . rotary table
V, Vn, Vnb, Vtn . . . normal vector
Vnx, Vtnx, Vx . . . X component
Vny, Vtny, Vy . . . Y component
Vnz, Vtnz, Vz . . . Z component
W . . . measurement object
θ, θ1, φ, ω . . . angle

The invention claimed is:

1. A shape reconstruction method for reconstructing a shape of a measurement object by applying illumination light to the measurement object and processing an image that has been captured, the shape reconstruction method comprising:
    applying, to the measurement object, the illumination light, after having passed through at least a filter, having a specific irradiation solid angle including a plurality of solid angle regions with optical attributes, each different from each other;
    receiving object light, generated by the illumination light, from the measurement object at a predetermined observation solid angle and capturing the image;
    obtaining a normal vector at each point of the measurement object corresponding to each pixel in two dimensions from an inclusion relation between the plurality of solid angle regions, constituting the object light, and the predetermined observation solid angle, on a basis of the optical attributes identified at each pixel, in two dimensions, of the image;
    obtaining, from the normal vector, inclination information for each point of the measurement object and reconstructing the shape of the measurement object;
    comparing a normal vector at each point of the measurement object corresponding to each pixel in two dimensions stored in advance with the normal vector at each point obtained from the measurement object newly imaged; and
    determining defect information based on a state in which the normal vector at each point of the measurement object stored in advance and the normal vector at each point of the measurement object newly imaged is equal to or greater than a predetermined threshold value,
    wherein the filter includes a plurality of filter regions, and each of the plurality of filter regions is only concentrically arranged with respect to the irradiation optical axis, and
    wherein the plurality of filter regions are configured to separate an inside of the specific irradiation solid angle into the plurality of solid angle regions, such that each of the plurality of solid angle regions are only concentric around the irradiation optical axis of the illumination light.

2. The shape reconstruction method according to claim 1, wherein the specific irradiation solid angle is allowed to be uniform at each point of the measurement object.

3. The shape reconstruction method according to claim 1, wherein the optical attributes are light wavelength ranges.

4. The shape reconstruction method according to claim 1, further comprising, before applying the illumination light to the measurement object, applying the illumination light to the measurement object itself or a specific jig, receiving the object light from the measurement object itself or the specific jig and capturing the image, and obtaining correspondence relations between the optical attributes and the normal vector is performed.

5. The shape reconstruction method according to claim 4, wherein the specific jig is a reference sphere or a reference plane.

6. The shape reconstruction method according to claim 4, wherein the correspondence relations are configured as a correspondence table.

7. The shape reconstruction method according to claim 4, wherein the correspondence relations are configured as a complementary function.

8. The shape reconstruction method according to claim 1, wherein the normal vector is normalized.

9. A shape reconstruction method for reconstructing a shape of a measurement object by applying illumination light to the measurement object and processing an image that has been captured, the shape reconstruction method comprising:
    applying, to the measurement object, the illumination light, after having passed through at least a filter, having a specific irradiation solid angle including a plurality of solid angle regions with optical attributes, each different from each other;
    receiving object light, generated by the illumination light, from the measurement object at a predetermined observation solid angle and capturing the image;
    obtaining a normal vector at each point of the measurement object corresponding to each pixel in two dimensions from an inclusion relation between the plurality of solid angle regions, constituting the object light, and the predetermined observation solid angle, on a basis of the optical attributes identified at each pixel, in two dimensions, of the image;
    obtaining, from the normal vector, inclination information for each point of the measurement object and reconstructing the shape of the measurement object; and
    comparing a normal vector at each point of the measurement object corresponding to each pixel in two dimensions stored in advance with the normal vector at each point obtained from the measurement object newly imaged; and
    determining defect information based on a state in which the normal vector at each point of the measurement object stored in advance and the normal vector at each point of the measurement object newly imaged is equal to or greater than a predetermined threshold value,
    wherein the filter includes a plurality of filter regions, and each of the plurality of filter regions is only concentrically arranged with respect to the irradiation optical axis, and no transparent region is disposed at a center of the filter,
    wherein the plurality of filter regions are configured to separate an inside of the specific irradiation solid angle into the plurality of solid angle regions,
    wherein the plurality of solid angle regions are provided around the irradiation optical axis of the specific irradiation solid angle of the illumination light.

10. An image measurement device for measuring a shape of a measurement object, the image measurement device comprising: an illumination device configured to apply illumination light to the measurement object; an imaging device configured to capture an image of the measurement object and output the image; and a processing device configured to process the image, wherein:
    the illumination device has a light source configured to emit the illumination light, a lens configured to apply the illumination light to the measurement object at a specific irradiation solid angle, and a filter, which is disposed between the light source and the lens, that is configured to separate an inside of the specific irradiation solid angle into a plurality of solid angle regions with optical attributes, each different from each other;

the imaging device receives object light, generated by the illumination light, from the measurement object at a predetermined observation solid angle, and pixels of the imaging device can each identify the different optical attributes; and the processing device, including a memory, is configured to obtain a normal vector at each point of the measurement object corresponding to each pixel in two dimensions from an inclusion relation between the plurality of solid angle regions, constituting the object light, and the predetermined observation solid angle, and is configured to reconstruct, from the normal vector, the shape of the measurement object by obtaining inclination information for each point of the measurement object, and wherein the filter includes a plurality of filter regions, and each of the plurality of filter regions is only concentrically arranged with respect to the irradiation optical axis, wherein the plurality of filter regions are configured to separate the inside of the specific irradiation solid angle into the plurality of solid angle regions, such that each of the plurality of solid angle regions are only concentric around the irradiation optical axis of the illumination light, and wherein the processing device is further configured to compare a normal vector at each point of the measurement object corresponding to each pixel in two dimensions stored in advance with the normal vector at each point obtained from the measurement object newly imaged, and, determine defect information based on a state in which the normal vector at each point of the measurement object stored in advance and the normal vector at each point of the measurement object newly imaged is equal to or greater than a predetermined threshold value.

11. The image measurement device according to claim 10, wherein the filter is disposed on an irradiation optical axis of the illumination light in a vicinity of a position determined by a focal length of the lens.

12. The image measurement device according to claim 10, wherein the filter is configured to allow the light wavelength ranges, as the optical attributes, to be different from each other.

13. The image measurement device according to claim 10, wherein the processing device includes the memory configured to store correspondence relations between the optical attributes and the normal vector, and the processing device is further configured to obtain the normal vector on a basis of the correspondence relations.

14. The image measurement device according to claim 10, wherein the processing device normalizes the normal vector.

15. The image measurement device according to claim 10, comprising a rotary table configured to be capable of rotating the measurement object around an observation optical axis.

* * * * *